United States Patent [19]
Oka et al.

[11] Patent Number: 5,726,436
[45] Date of Patent: Mar. 10, 1998

[54] APPARATUS AND METHOD FOR COMPENSATING COMA ABERRATION

[75] Inventors: Michio Oka, Kanagawa; Naoya Eguchi, Tokyo; Hiroshi Suganuma, Ibaraqi, all of Japan

[73] Assignee: Sony Corporation, Tokyo, Japan

[21] Appl. No.: 762,508

[22] Filed: Dec. 10, 1996

Related U.S. Application Data

[63] Continuation of Ser. No. 340,959, Nov. 17, 1994, abandoned.

[30] Foreign Application Priority Data

Nov. 18, 1996 [JP] Japan .................................. 5-289609

[51] Int. Cl.$^6$ .................................. G02B 3/02; G11B 7/00
[52] U.S. Cl. .................................. 250/201.5; 369/44.23; 359/637; 359/719
[58] Field of Search .................. 250/201.5; 359/637, 359/737, 708, 719, 720, 728; 369/44.11, 44.21, 44.22, 44.23

[56] References Cited

U.S. PATENT DOCUMENTS

| | | | |
|---|---|---|---|
| 4,365,323 | 12/1982 | Heemskerk et al. | 369/44.23 |
| 4,634,853 | 1/1987 | Kanamaru | 250/201 |
| 4,641,929 | 2/1987 | Braat | 359/719 |
| 4,820,029 | 4/1989 | Iwai et al. | 359/719 |
| 4,968,874 | 11/1990 | Kasuga | 369/44.23 |
| 5,418,765 | 5/1995 | Misawa et al. | 369/44.23 |

*Primary Examiner*—Edward Westin
*Assistant Examiner*—John R. Lee
*Attorney, Agent, or Firm*—Chalres M. Fish, Esq.; Jerry A. Miller; Pasquale Musacchio, Esq.

[57] ABSTRACT

An optical pick-up apparatus includes a light source, an objective lens, a beam splitter, a detector, a first optical compensating device and a second optical compensating device. The objective lens converges a light beam emitted from the light source at one point on an optical axis. The beam splitter separates the light beam emitted from the light source from a returning light reflected on an optical disc. The detector detects the returning light separated from the light beam emitted from the light source. The first optical compensating device has a convex aspherical surface represented by $\bar{X}\alpha R^4$ and is located on an optical path where the light beam is emitted from the light source. The second optical compensating device has a concave aspherical surface represented by $+\alpha R^4$ and is located on an optical path where the light beam is emitted from the light source.

14 Claims, 8 Drawing Sheets

APPARATUS AND METHOD FOR COMPENSATING COMA ABERRATION

This application is a continuation of Ser. No. 08/340,959, now abandoned, filed Nov. 17, 1994.

FIELD OF THE INVENTION

The present invention relates to an optical pick-up apparatus and an optical disc recording and/or reproducing apparatus. More particularly, the present invention relates to a method for compensating coma aberration, an optical pick-up apparatus using the same and an optical disc recording and/or reproducing apparatus using the same.

BACKGROUND OF THE INVENTION

It is important for the design of an optical system to reduce spherical aberration and coma aberration. Abbe's sine condition has been proposed as a design guide for reducing coma aberration. However, it is difficult to control coma aberration freely.

Skew error is caused when the optical axis of a light beam used for reading recorded information is not perpendicular to the plane of a recording disc. Skew error may be caused because of deformation of the recorded disc or because of a slant of the axis around which the disc is rotated due to deformation of the deck portion of the reproducing apparatus. There has been provided a optical pick-up apparatus for an optical disc including a tilt servo system in which an optical head unit is inclined in the direction of compensating skew error so as to compensate the skew error. However such tilt servo system makes the optical pick-up apparatus large in size. Further, the optical pick-up apparatus can follow the change of the surface of the optical disc only at a low frequency when the optical disc is rotated.

A wave-length of an optical beam which is emitted from an optical pick-up apparatus has been shortened so as to increase a recording density in an optical disc. Further, the numerical aperture of the objective lens has been increased so as to increase the recording density in an optical disc. However, when the numerical aperture of the objective lens becomes greater in an optical pick-up apparatus, the optical pick-up apparatus becomes more subject to the effects of an inclined angle of the recording surface of the optical disc. In other words, the margin of error in the assembly of the optical pick-up or the allowable error range in the optical pick-up apparatus or in the optical recording and/or reproducing apparatus is lowered.

SUMMARY OF THE INVENTION

One object of the present invention is to provide an optical pick-up apparatus which is compensated for coma aberration.

Another object of the present invention is to provide an optical disc recording and/or reproducing apparatus which is compensated for coma aberration.

Further, another object of the present invention is to provide a method for compensating coma aberration.

According to a first embodiment of this invention, an optical pick-up apparatus has a light source, an objective lens for converging a light beam emitted from the light source at one point on an optical axis. Further, the optical pick-up apparatus has a beam splitter for separating the light beam emitted from the light source from a returning light reflected back from the optical disc, a detector for detecting the returning light separated from the light beam emitted from the light source and an optical compensating device having a convex aspherical surface and a concave aspherical surface which are represented by $+\alpha R^4$ and located on an optical path where the light beam is emitted from the light source, wherein R is a normalized pupil radius and $\alpha$ is a fourth aspherical coefficient.

DETAILED DESCRIPTION OF THE INVENTION

A method for compensating coma aberration, an optical pick-up apparatus using the same and an optical disc recording and/or reproducing apparatus using the same of the present invention are explained referring to figures.

Figure 1:
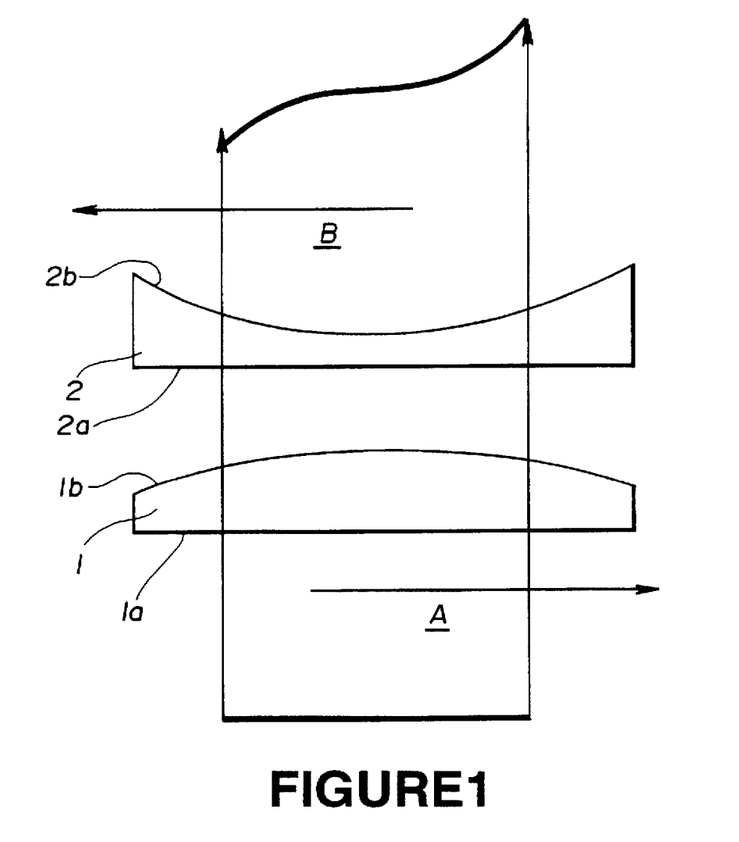
FIG. 1 is a side view showing an apparatus performing a method for compensating coma aberration of the present invention.

A method for compensating coma aberration will be described in connection with FIG. 1. Two optical compensating devices 1 and 2 are located at an optical path of an optical system having coma aberration in the present invention as shown in FIG. 1. These optical compensating devices 1 and 2 are moved in the direction of arrows A and B as shown in FIG. 1. The directions A and B are perpendicular to the optical axis of the optical system. The optical compensating devices 1 and 2 are moved in the opposite direction to each other. In other words, coma aberration which is opposite the coma aberration generated in the optical system is generated by changing the relative positions of the optical compensating devices 1 and 2. The coma aberration of the optical system is thereby compensated. As used herein, coma aberration includes first-order to fifth-order coma aberration regardless of its direction. The optical compensating device 1 has a convex aspherical surface 1b determined by the formula $\pm\alpha R^4$ (R=normalized pupil radius; $\alpha$=fourth-order aspherical coefficient). The optical compensating device 2 has a concave aspherical surface 2b determined by the formula $\pm\alpha R^4$. Each surface of incidence 1a, 2a of the optical compensating device 1, 2 is planar. Each surface for outputting a light beam 1b, 2b of the optical compensating device 1, 2 is aspherical. The relative moving direction of the optical compensating device 1, 2 is determined by the direction of coma aberration generated in the optical system. Therefore, it is not necessary that the moving direction of the optical compensating device is respectively the direction of the arrows A, B of FIG. 1. Coma aberration is compensated by moving the optical compensating devices 1 and 2 in opposite directions in a plane being perpendicular to the optical axis of the optical system.

These optical compensating devices 1, 2 may be devices having a wavefront conversion function which is equal to the above-disclosed aspherical surface. For instance, these optical compensating devices 1, 2 may have an aspherical surface which is approximated by a quantized step shape. These optical compensating devices 1, 2 may be made by abrading a spherical surface of a gradient-index lens.

When an optical system is an optical pick-up apparatus for reading information signals from an optical disc, optimum moving amounts of the two optical compensating devices 1, 2 are given by moving the two optical compensating device in opposite directions so as to compensate for coma aberration; coma aberration being proportion to a skew angle of an optical disc. The optimum amount for compensating coma aberration $(W_{31})'$ is determined by the following formula (1).

$$W_{31}-(W_{31})'=-(6/5)W_{51} \quad (1)$$

Here, $W_{31}$ is third-order coma aberration coefficient and $W_{51}$ is fifth-order coma aberration coefficient.

When these optical compensating devices 1, 2 are located on an optical path formed in an optical pick-up apparatus for an optical disc, the optical pick-up apparatus can follow coma aberration caused by rotating deflection or a warp of the optical disc so as to compensate coma aberration even at a high frequency. A skew detecting device for an optical disc is provided therein so as to calculate coma aberration amount. A driving device moves the two optical compensating devices 1, 2 based on the coma aberration amount calculated by the skew detecting device.

Coma aberration caused by skew of optical disc will next be described. When a wave-length of an optical beam which is emitted from an optical pick-up apparatus is shortened and/or the numerical aperture of the objective lens used in an optical pick-up apparatus is increased, coma aberration caused by skew of an optical disc is increased during reproduction. The increase of coma aberration results in a large amount of noise. As a result, coma aberration is a greater problem in an optical system when the recording density on an optical disc is increased. As is known, an optical disc is made by providing a signal recording layer on one side of a transparent synthetic resin disc substrate. The side provided a signal recording layer of the disc substrate is a signal recording part. Information signals are written on, or read from, the optical disc through the optical disc from the other side of the optical disc.

Third or fifth-order coma aberration is proportional to the skew of an optical disc in an optical system. Third or fifth-order coma aberration coefficient ($W_{31}$, $W_{51}$) caused by skew $\theta$ (rad) of an optical disc is given by the following formulas (2) and (3).

$$W_{31}=1/2 \cdot (N^2-1)/N^3 \cdot \theta NA^3 \quad (2)$$

$$W_{51}=1/8 \cdot (N^2-1)(N^2+3)/N^5 \cdot \theta NA^5 \quad (3)$$

Here, t is a thickness of an optical disc, N is a refractive index of the optical disc, and NA is a numerical aperture of an objective lens. Coma aberration caused by an optical disc is mainly attributed to third-order coma aberration, which can be compensated by the method for compensating coma aberration of the present invention.

The principles of the present invention will next be described. The optical compensating devices 1 and 2 used in the present invention are two aspherical plates. One is a concave aspherical plate. The other is a convex aspherical plate. Coma aberration having a direction opposite the direction of coma aberration caused by skew of an optical disc is generated by moving the optical compensating devices 1 and 2 in a direction perpendicular to the optical axis as shown in FIG. 1 so as to compensate coma aberration caused by skew of an optical disc. The optical compensating devices 1 and 2 are moved in opposite directions as shown in FIG. 1. The moving amount of each optical compensating device is +s or −s. The shape of each optical compensating device is represented as the following formula (4).

$$Z=a \cdot r^4 \quad (4)$$

Here, a is the fourth aspherical coefficient and r is normalized pupil radius. Optical path difference (OPD) generated by the optical compensating devices 1 and 2 is represented by the following formula (5).

$$\begin{aligned} OPD+(x,y) &= +(N-1)a \cdot r^4 \\ &= +(N-1)a \cdot (x^2+y^2)^2 \end{aligned} \quad (5)$$

When the optical compensating devices 1 and 2 are moved in the direction of the x axis with a moving amount of +s or −s and $\theta$ is in a pupil plane. The compensating wavefront ($\overline{W}$) is represented by the following formula (6).

$$\begin{aligned} \overline{W} &= OPD_+(x+s,y) + OPD_-(x-s,y) \\ &= (N-1)8 \cdot a \cdot s \cdot r^3\cos\theta + \\ &\quad (N-1)8 \cdot a \cdot s \cdot r\cos\theta \\ &= \text{(third coma aberration)} + \text{(wavefront tilt)} \end{aligned} \quad (6)$$

The wavefront tilt (the second term of the above formula) may be ignored, because it is very small. Therefore the compensating wavefront ($\overline{W}$) becomes equal to the wavefront of third-order coma aberration, changing in proportion to the moving amount s. Because the compensated coma aberration amount is very small, the tilt amount is also very small. Further, because the tilt is moved on an image surface, a tracking servo can follow the tilt in an optical disc. As a result, it is acceptable to ignore the wavefront tilt. Therefore, coma aberration having the direction which is opposite to the direction of coma aberration caused by the skew of an optical disc is generated so as to compensate coma aberration caused by the skew of an optical disc.

Compensating including higher order coma aberration compensation will next be described. When a numerical aperture NA of an objective lens is large, a third approximation is not enough to compensate coma aberration. When a numerical aperture NA of an objective lens is large, a fifth approximation is necessary to satisfactorily compensate coma aberration. Presuming fifth-order coma aberration, the variance of wavefront is determined by the following formula (7):

$$W=W_{11}r\cos\theta + W_{31}r^3\cos\theta + W_{51}r^5\cos\theta \quad (7)$$

The shape of wavefront is represented as W including a tilt. The variance of wavefront (VAR) is determined by the following formula (8). This formula (8) is calculated regarding the shape of the wavefront as follows.

$$VAR = \frac{\iint W^2 r dr d\theta}{\iint r dr d\theta} - \left[\frac{\iint W^2 r dr d\theta}{\iint r dr d\theta}\right]^2 \quad (8)$$

$$= \frac{1}{4} W_{11}^2 + \frac{1}{8} W_{31}^2 + \frac{1}{12} W_{51}^2 + \frac{1}{3} W_{11}W_{31} + \frac{1}{5} W_{31}W_{51} + \frac{1}{4} W_{51}W_{11}$$

The minimum value of VAR after compensating for tilt is determined by changing the tilt ($W_{11}$) of the wavefront.

$$\frac{\partial VAR}{\partial W_{11}} = \frac{1}{2} W_{11} + \frac{1}{3} W_{31} + \frac{1}{4} W_{51} = 0 \quad (9)$$

$$W_{11} = -\frac{2}{3} W_{31} - \frac{1}{2} W_{51} \quad (10)$$

The formula (10) gives the minimum value to VAR.
The formula (9) substitutes for $W_{11}$ of the formula (7).

$$VAR\text{min} = \frac{1}{72} W_{31}^2 + \frac{1}{30} W_{31}W_{51} + \frac{1}{48} W_{51}^2 \quad (11)$$

Therefore, the RMS of wavefront aberration after compensating for tilt is determined by the formula (12).

$$RMSwvfr = \sqrt{\frac{1}{72} W_{31}^2 + \frac{1}{30} W_{31}W_{51} + \frac{1}{48} W_{51}^2} \quad (12)$$

The RMS of wavefront aberration after compensating for third-order coma aberration is determined by determining the extreme value of wavefront aberration for $W_{31}$, if the third-order coma aberration is controlled by optical compensating devices 1 and 2. The extreme value of $W_{31}$ is calculated by the formula (13).

$$\frac{\partial VAR}{\partial W_{31}} = \frac{1}{3} W_{11} + \frac{1}{4} W_{31} + \frac{1}{5} W_{51} = 0 \quad (13)$$

The value of $W_{31}$ is determined by formula (14).

$$W_{31} = -\frac{4}{3} W_{11} - \frac{4}{5} W_{51} \quad (14)$$

The formula (14) substitutes for $W_{31}$ of the formula (10).

$$W_{11} = \frac{3}{10} W_{51} \quad (15)$$

$$W_{31} = -\frac{6}{5} W_{51} \quad (16)$$

$$VAR\text{min} = \frac{1}{1200} W_{51}^2 \quad (17)$$

$$RMSwvfr = \frac{1}{\sqrt{1200}} W_{51} \quad (18)$$

Thus, the RMS of wavefront aberration is compensated. When a compensating amount of third-order coma aberration generated by the optical compensating devices 1 and 2 is represented as $\overline{W}_{31}$, the minimum wavefront aberration is obtained by formula (19).

$$W_{31} - \overline{W}_{31} = -\frac{6}{5} W_{51} \quad (19)$$

This formula (19) is a basic formula for coma aberration compensation including higher order coma aberration compensation. Formula (20) is introduced by the formulas (19), (1) and (4).

$$W_{31} = \overline{W}_{31} + \frac{6}{5} W_{51} \quad (20)$$

$$= \left\{ \frac{t}{2} \frac{N^2-1}{N^3} NA^3 \left(1 + \frac{3}{10} \frac{N^2+3}{N^2} NA^2\right) \right\} \theta$$

$$= 8as(N-1)$$

Moving amount s is introduced like formula (21).

$$s = \left\{ \frac{t}{16a} \frac{N+1}{N^3} NA^3 \left(1 + \frac{3}{10} \frac{N^2+3}{N^2} NA^2\right) \right\} \theta \quad (21)$$

The optical compensating devices 1 and 2 are moved in the opposite direction to each other with the moving amount s.

A method for preparing an optical compensating device is next described. Some types of methods for preparing optical compensating device performing the principle of the present invention are disclosed as follows:

(1) Aspherical Shape

Figure 2:
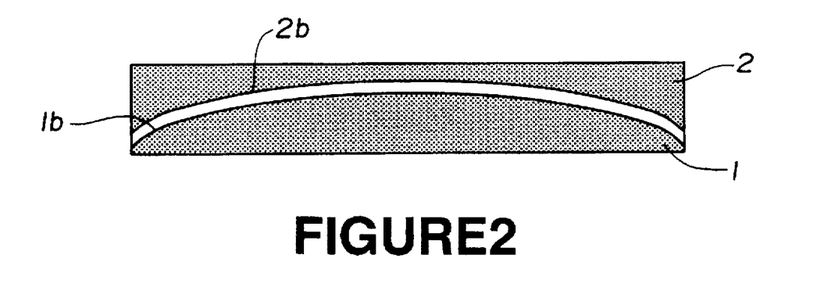
FIG. 2 is a side view showing a shape of an optical compensating device used for the method for compensating coma aberration.

The optical compensating devices 1 and 2 respectively have a fourth aspherical surface 1b or 2b as shown in FIG. 2. The optical compensating device having a fourth aspherical surface is mass-produced by molding similar to an ordinary aspherical lens. The optical compensating device having a fourth aspherical surface can be also produced by polishing an aspherical surface.

Figure 3:
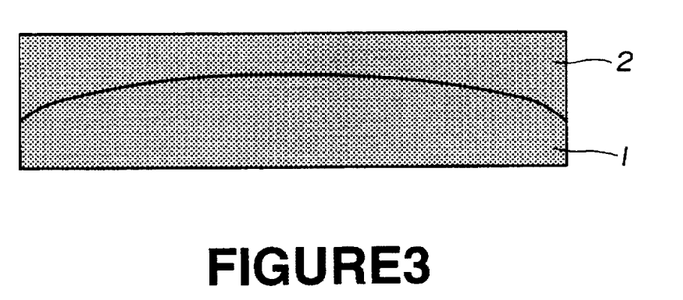
FIG. 3 is a side view showing another shape of an optical compensating device of which medium has a refractive index distribution.

(2) Method for Preparing the Optical Compensating Device Using a Gradient-Index Material A gradient-index material is prepared by doping so that its refractive index is proportional to, or inversely proportional to, the square of a distance from the center. Then, the gradient-index material is cut thinly. Further, the thin gradient-index material is polished so as to obtain a gradient-index lens as shown in FIG. 3. The gradient-index lens has a fourth aspherical surface and a refractive index and thickness which are in proportion to the square of optical path length. Productivity may be improved by selecting curvature radius for polishing a spherical surface. This method is easier to estimate in manufacturing because of polishing a spherical surface compared with polishing an aspherical surface. As such, it may obtain an aspherical surface having higher precision.

(3) Method For Preparing Optical Compensating Device Using a Binary Shape

Figure 4:
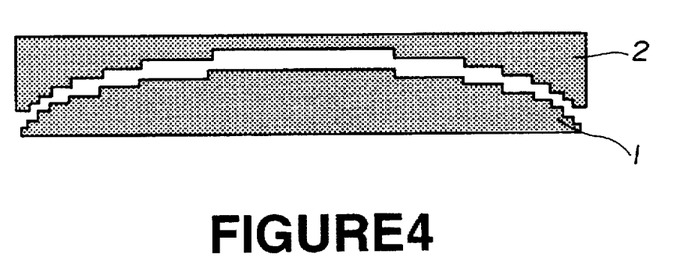
FIG. 4 is a side view showing another shape of an optical compensating device which has a quantized shape.

An optical device like a lens has been prepared by polishing or molding. A binary optical lens is prepared by a process technology similar to lithography etching. As shown in FIG. 4, a binary optical lens has quantized steps which gives an optical path difference of wavelength of optical beam emitted from an optical source order to a glass surface. A binary optical lens directly deforms a transmission wavefront.

Figure 5:
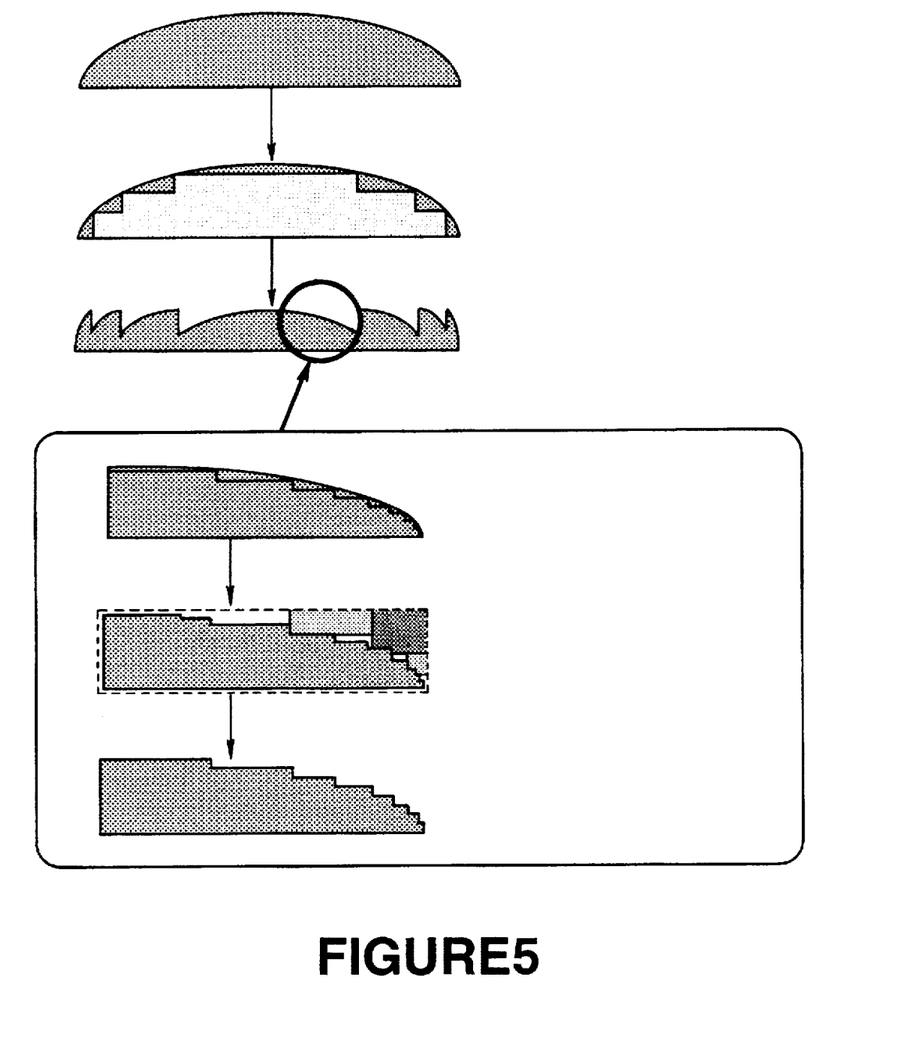
FIG. 5 is a view showing producing steps of a binary lens used for an optical compensating device.

A binary optical lens having eight steps may be prepared by etching with three times exposure. A binary optical lens having four steps may be prepared by etching with two times exposure. At first a lens is approximated by two steps. Further, each of two steps is approximated by two steps. The steps are increased by geometrical progression as shown in FIG. 5 by repeating this approximation process. An optical compensating device may be approximated to a shape having a fourth aspherical surface by this process.

(4) Design of Binary Optical Lens

Figure 6:
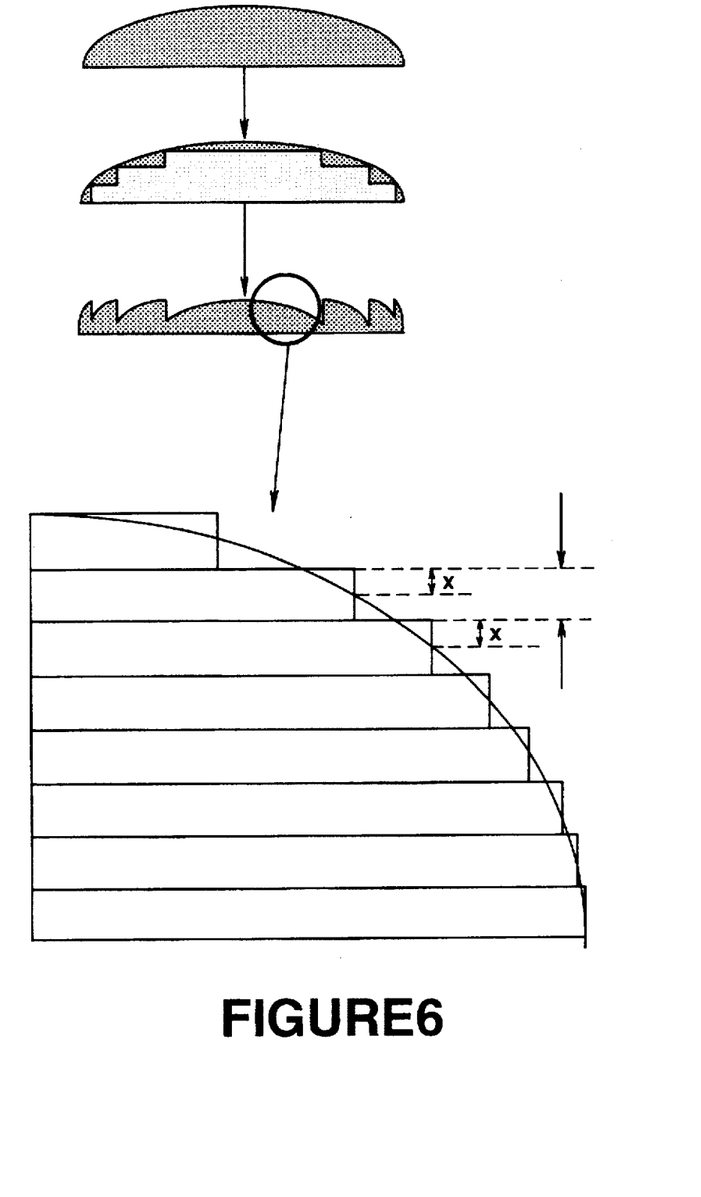
FIG. 6 is an enlarged view of a binary lens.

A binary optical lens is designed by approximating to an aspherical surface. Because an aspherical surface plate has an ideal function, an optical device having the best characteristics is expected to obtain by approximating to an aspherical surface plate. The process for preparing an optical lens having n steps is as shown in FIG. 6 and as follows:

In step 1 an optical lens is cut so as to have a different thickness generating a wavelength of optical beam emitted from optical source difference every thickness on an optical path (preparing a Fresnel lens).

In step 2 the height from the top to the bottom is divided to 2 n equally.

In step 3 a step is provided at a point of k/2 n (k=1~(2 n−1):odd number).

This is a design concept so as to minimize a shift from the aspherical surface from peak to peak, which is represented as x in FIG. 6.

Figure 7:
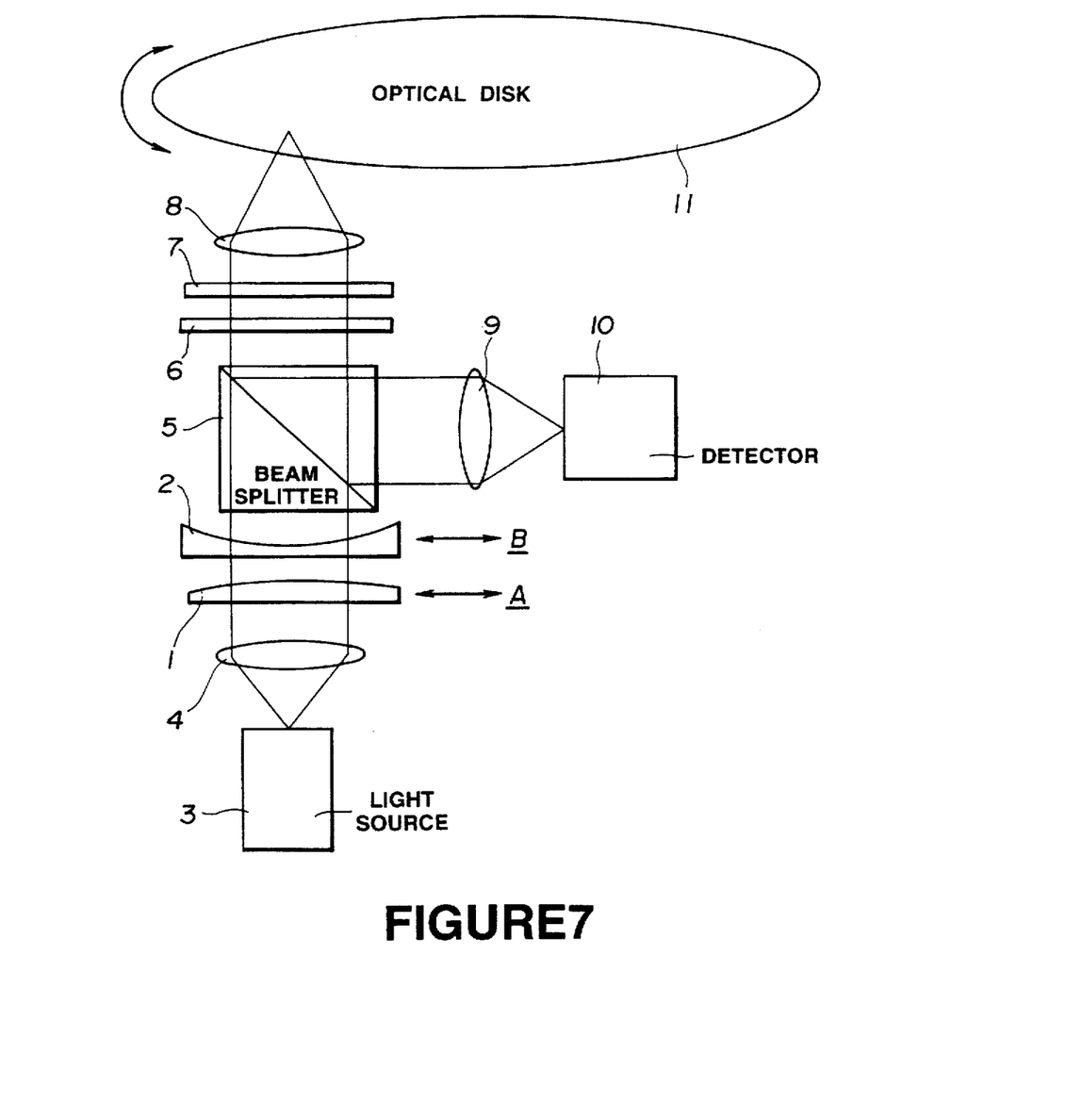
FIG. 7 is a side view showing an optical pick-up apparatus which is applied to a method for compensating coma aberration of the present invention.
Figure 8:
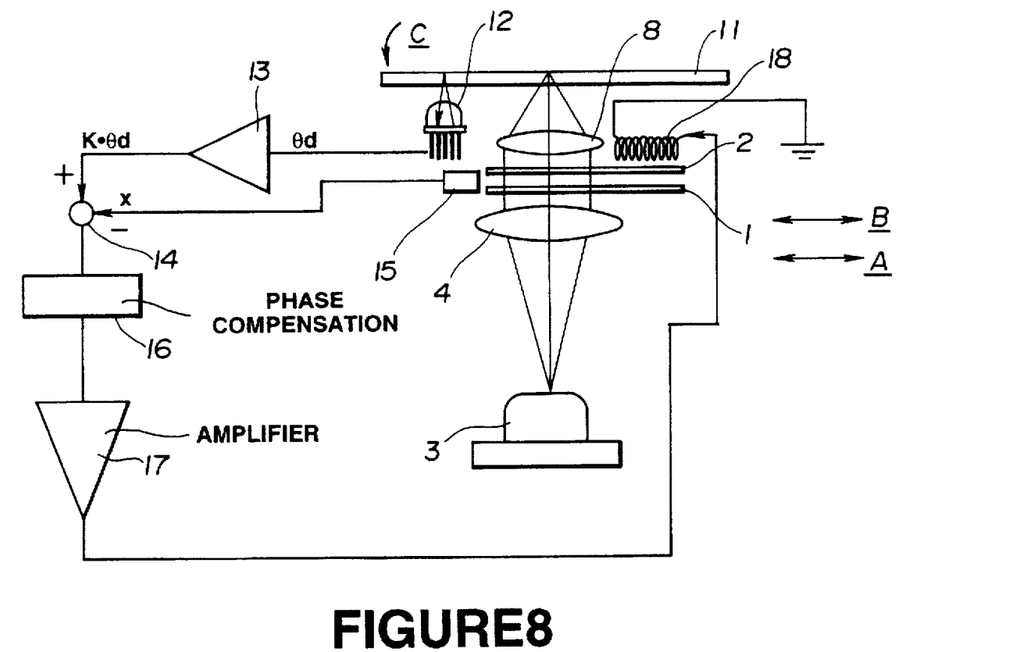
FIG. 8 is a block diagram of an optical disc recording and/or reproducing apparatus having an optical pick-up apparatus.

The present invention is applied to an optical pick-up apparatus for optical disc as exemplified in FIG. 7 and FIG. 8. Optical compensating devices 1 and 2 are located in an optical path of a parallel light beam exiting an optical pick-up apparatus. When optical compensating devices 1 and 2 are located in a convergent light beam, the optical compensating devices respectively have a shape adding an amount of a second wavefront of a convergent light beam to a fourth aspherical surface.

Coma aberration generated on an optical disc causes deformation in the shape of light spot thereon. However, the coma aberration does not effect the light spot on the return trip of the light beam. Therefore, optical compensating devices 1 and 2 should be located on an optical path of the light beam before the beam converges on the optical disc.

A divergent light beam emitted from a light source 3 such as a laser diode is converted to a parallel light beam by a collimator lens 4 in the optical pick-up apparatus as shown in FIG. 7. This parallel light beam goes through the optical compensating devices 1 and 2. Then the parallel light beam is incident to a beam splitter 5. The optical compensating devices 1 and 2 are arranged to move in opposite directions in the plane perpendicular to the optical axis in the optical pick-up apparatus. In FIG. 7, the optical compensating device 1 is arranged to move in the direction of arrow A and the optical compensating device 2 is arranged to move in the direction of arrow B. However, they are not limited to move in the direction of arrow A or B. The optical compensating devices 1 and 2 may be moved in another direction based on the direction of disc tilt or the direction of coma aberration. The light beam goes through the beam splitter 5, a quarter wave plate 6 and a diffraction grating 7, then is incident to an objective lens 8. The objective lens 8 concentrates the parallel light beam being incident to the objective lens 8 on a signal recording layer of the optical disc 11. The light beam is reflected on the signal recording layer of the optical disc 11. The reflected light beam returns back to the objective lens 8 while diverging. The light beam is converted to a parallel light beam again at the objective lens 8. Then the light beam goes through the diffraction grating 7 and the quarter wave plate 6, then is incident to the beam splitter 5. The light beam is reflected by the reflecting surface of the beam splitter 5, then is incident to a detecting lens (convergent lens) 9. The detecting lens concentrates the incident light beam on a detector 10 being a light detecting device such as a photo diode. Many types of signals such as a signal for reading out, a tracking error signal and a focus error signal are produced by the signal output form the detector 10.

A skew sensor 12 for detecting a tilt amount of an optical disc 11 is provided in an optical disc recording and/or reproducing apparatus having an optical pick-up apparatus as shown in FIG. 8. The skew sensor 12 has a light emitting device and a light receiving device. The light receiving device has a plurality of light receiving elements. A light beam emitted from the light emitting device is irradiated on the optical disc 11. The light receiving device receives the light beam reflected by the optical disc 11. A skew error is detected by the position of the light beam spot on the light receiving device provided in the skew sensor 12. The skew error detecting signal (θd) being output signal from the skew sensor 12 is amplified to K times thereof by an amplifier 13. The amplified signal (K·θd) is supplied to a comparator 14. A position detecting signal (x) output from a position detecting sensor 15 which detects the positions of the optical compensating devices 1 and 2 is also supplied to the comparator 14. A differential signal obtained by comparing the amplified signal (K·θd) with the position detecting signal (x) is amplified by an amplifier 17 through a phase compensation circuit 16. The amplified signal is supplied to a coil 18 having a structure for moving and operating the optical compensating devices 1 and 2. The coil 18 moves each optical compensating device in the opposite direction to each other and in the plane being perpendicular to the optical axis based on a supplied electric current. For example, when the optical disc is inclined to the direction in parallel to the plane of the page (the direction of arrow C) as shown in FIG. 8, the optical compensating devices 1 and 2 are respectively moved in the direction of arrow A or arrow B. When the optical disc is inclined to a direction perpendicular to the plane of the page (perpendicular to arrow C), the optical compensating devices 1 and 2 are respectively moved in the direction being perpendicular to the plane of the page. The moving direction of the optical compensating devices 1 and 2 is changed based on the tilt direction of the optical disc 11.

Thus, coma aberration generated by a skew of an optical disc 11 is offset by coma aberration generated by the optical compensating devices 1 and 2 in the optical disc recording and/or reproducing apparatus. Therefore, the information signal is written on and read out from the optical disc 11 without error.

With regard to data simulation, an optical compensating device 1 having an aspherical surface 1b and an optical compensating device 2 having an aspherical surface 2b are prepared. The aspherical surfaces 1a and 2a are represented as $z=(0.25*10^{-4})r^{-4}$. A compensating state of coma aberration is simulated in the optical pick-up apparatus when a skew of one degree is given to an optical disc having a thickness of 1.2 mm. The aspherical surface 1b or 2b has a convex or a concave shape having a displacement of 2.6 μm at the position of 3.2 mm from the optical axis. The numerical aperture (NA) of the objective lens 8 in the optical pick-up apparatus is 0.6. The moving distance (s) of the optical compensating devices 1 and 2 is respectively +1 or −1.

Figure 9:
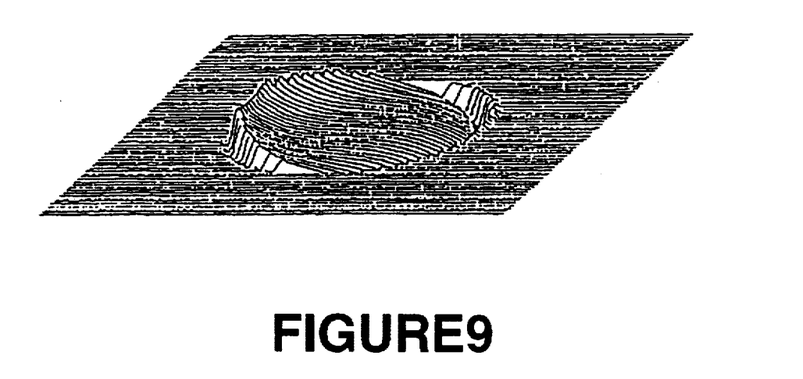
FIG. 9 is a three-dimension graph showing wavefront aberration amount wherein coma aberration has not been compensated.
Figure 11:
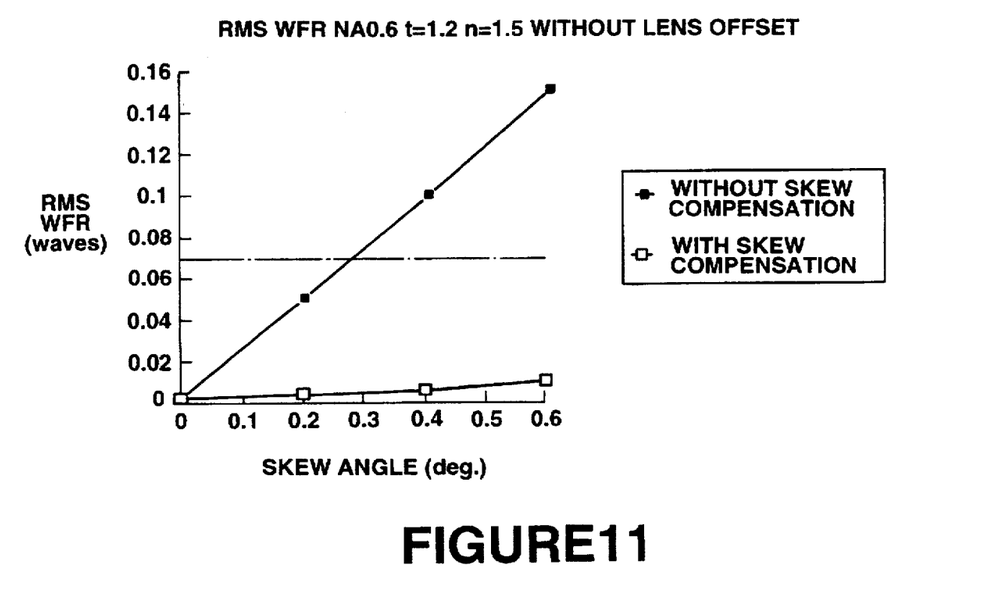
FIG. 11 is a graph showing a relation between a slant angle of an optical disc and a wavefront aberration amount wherein coma aberration has not been compensated and wherein coma aberration has been compensated.

When aberration is not compensated by optical compensating devices 1 and 2, coma aberration of approximately 0.25λ(λ=523 nm) is generated on an RMS wavefront as shown in FIG. 9. This aberration amount is approximately four times the diffraction limit 0.07λ as shown in FIG. 11. When this aberration amount is generated, it is impossible to read out the information signal from the optical disc 11. When skew of an optical disc 11 is approximately 0.3 degree, aberration is approximately 0.07λ on RMS wavefront. Therefore, it is necessary to control the skew of an optical disc 11 to less than 0.3 degree. Further it is necessary to control skew of an optical disc 11 to less than 0.2 degree so as to keep RMS wavefront aberration less than 0.05λ.

Figure 10:
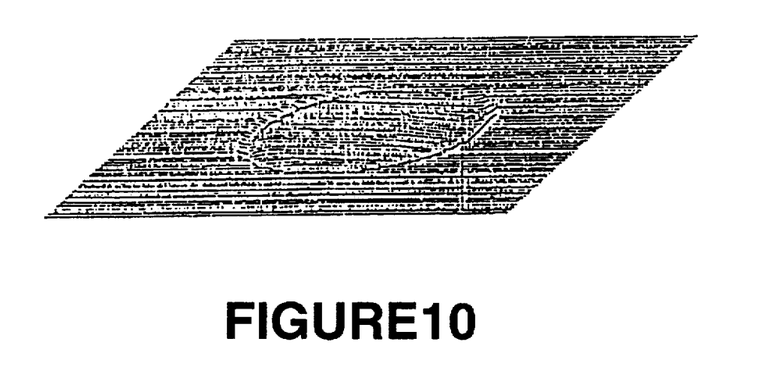
FIG. 10 is a three-dimension graph showing wavefront aberration amount wherein coma aberration has been compensated.

When aberration is compensated by optical compensating devices 1 and 2, aberration is controlled less than approximately 0.023λ (λ=523 nm) on RMS wavefront as shown in FIG. 10. This aberration amount is smaller than the diffraction limit 0.07λ as shown in FIG. 11. Accordingly, it is possible that even when the skew of an optical disc 11 is bigger than 0.6 degree, RMS wavefront aberration is kept to less than 0.05λ.

Figure 12:
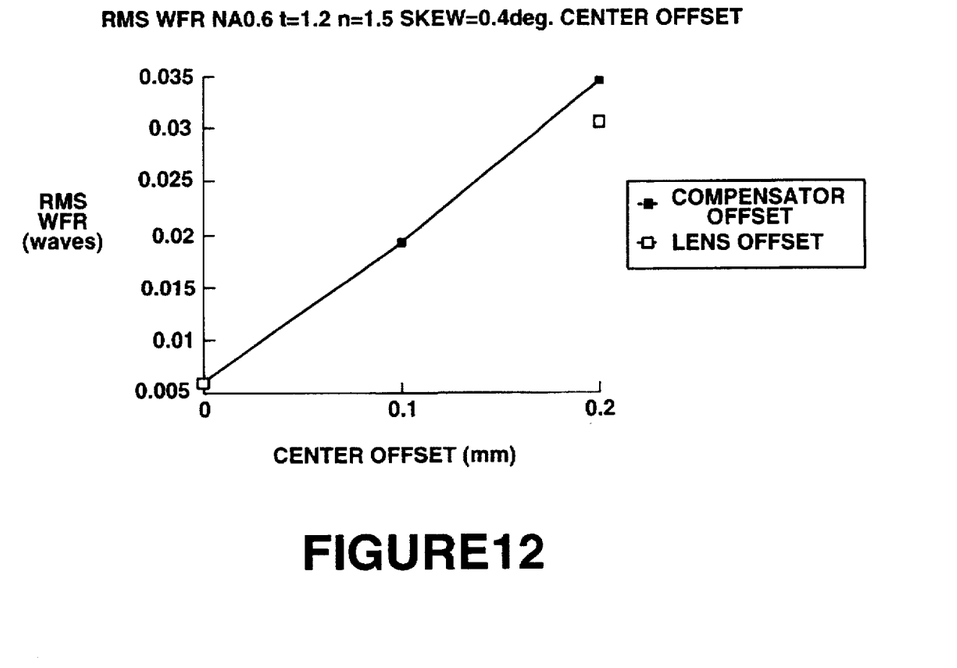
FIG. 12 is a graph showing a relation between an amount shifted from a center of an optical compensating device and astigmatism thereof.

Astigmatism is generated, when an optical axis of an objective lens 8 is shifted from each center position of an optical compensating devices 1 and 2 at the time when skew of an optical disc 11 is zero degree. When each center position of optical compensating devices 1 and 2 is shifted about 0.2 mm, astigmatism is 0.035λ as shown in FIG. 12. Therefore it is necessary to control a shift of each center position of an optical compensating devices 1 and 2 less than 0.2 mm. Further, when a shift of each center position of an optical compensating devices 1 and 2 is reduced, larger skew of an optical disc 11 is permissible.

Coma aberration can also be effected by a one-sided driving system. When one of two optical compensating devices 1 and 2 is shifted on a pupil plane so as to move a relative position between the optical compensating devices 1 and 2, coma aberration is generated to compensate for coma aberration generated in an optical system. Further it is possible to combine one or both of two optical compensating devices 1 and 2 with another device of the optical system so that the combined device has multiple functions. In the above disclosed method, because the optical compensating devices 1 and 2 are moved in opposite directions, the apparatus becomes complicated. Further, the apparatus has a large load to control and adjust. In this method, because only one optical compensating device is moved, the apparatus is simplified and has a similar effect to the above disclosed method. Further, in this method, because one of the optical compensating devices 1 and 2 is fixed, the fixed device is easily combined with another device of the optical system.

The principles of operation of the one-sided driving system are now described. One of two optical compensating devices 1 and 2 having a convex aspherical surface or a concave aspherical surface respectively is moved on a plane so as to generate coma aberration in the direction which is opposite to the direction of coma aberration generated by skew of an optical disc, thereby the coma aberration generated by skew of an optical disc is compensated.

Third and fifth coma aberration are in proportion to skew of an optical disc in an optical system. When skew θ (rad) of an optical disc is generated, third and fifth coma aberration coefficient ($W_{31}$, $W_{51}$) are determined as follows:

$$W_{31} = \frac{t}{2} \frac{N^2-1}{N^3} \theta NA^3 \quad (22)$$

$$W_{51} = \frac{t}{8} \frac{(N^2-1)(N^2+3)}{N^5} \theta NA^5 \quad (23)$$

Here, t is a thickness of an optical disc, N is a refractive index of an optical disc substrate, and NA is a numerical aperture of an objective lens. Because coma aberration generated on an optical disc substrate is mainly third coma aberration, the coma aberration can be compensated by the method of the present invention.

However astigmatism may be generated at the same time. The following is the explanation of the astigmatism.

When one of the optical compensating devices 1 and 2 is moved from the initial position ($x_0$, $y_0$) as shown in FIG. 9, an optical path difference between each luminous flux passing a position (x,y) on a pupil plane is determined by the following formula.

$$OPDwaves = \frac{\alpha(n-1)}{\lambda} [\{(x-x_0)^2 + (y-y_0)^2\}^2 - (x^2+y^2)^2] \quad (24)$$

$$= \frac{\alpha(n-1)}{\lambda} [-4\{x_0x(x^2+y^2) + y_0y(x^2+y^2)\} +$$

$$4(x_0^2+y_0^2)(x^2+y^2) - 2(x_0^2-y_0^2)(x^2-y^2) +$$

$$8x_0y_0xy]$$

$$= Coma_x + Coma_y + Spferical(=defocus) +$$

$$Astigma_0 + Astigma_{45}$$

Here, α is an aspherical coefficient normalized by forth pupil radius. The refractive index of the optical compensating device is represented as n (refractive index of air is 1) and λ is wavelength of optical beam emitted from optical source.

In other words, coma aberration is also generated, when one of optical compensating devices is moved. Astigmatism and defocus are generated accompanying the coma aberration. But defocus is removed or moved to an optimum image plane by a focus servo in an optical disc pick-up. Further astigmatism is a square term of $x_0$ and $y_0$, so astigmatism is controlled within a small enough range by increasing an aspherical coefficient α enough and moving the optical compensating device a small distance which is necessary to compensate coma aberration.

The relation between the compensating coma aberration coefficient generated by moving the optical compensating devices and the astigmia coefficient is represented by the following formula.

Astigmia coefficient=compensating coma aberration
coefficient*($-x_0/2$) (25)

The amount of compensating coma aberration is in proportion to a moving amount of optical compensating device and the fourth aspherical coefficient. Coma aberration of the same amount is compensated by a small moving amount, when the fourth aspherical coefficient is large. Astigmatism becomes small enough, when an amount of compensating coma aberration coefficient is constant and the moving amount of the optical compensating device is small. Therefore, when an optical compensating device is designed so as to have a large enough aspherical coefficient, astigmatism may be almost ignored.

A variance (VAR) of wavefront of astigmatism is represented as follows:

$$VAR = \frac{\iint W^2 r dr d\theta}{\iint r dr d\theta} - \left[\frac{\iint W^2 r dr d\theta}{\iint r dr d\theta}\right]^2 \quad (26)$$

The formula (26) is calculated like formula (27).

$$RMSSastigma = \frac{5}{48} W_{22}^2 \quad (27)$$

This result is plotted in the graph of FIG. 10 using an aspherical coefficient as the parameter in which a moving amount of an optical compensating device is on an abscissa axis and the RMS of astigmatism is on an ordinate axis. A moving amount of an optical compensating device is in proportion to an amount of compensating coma aberration. Therefore, when an amount of compensating coma aberration is on an abscissa axis instead of a moving amount of an optical compensating device and the result is plotted, the graph is similar to FIG. 10. Astigmatism reduces by half, reducing fourth aspherical coefficient by half. When the aspherical coefficient is enough large, astigmatism is ignored.

The optimum amount of compensating coma aberration is generated in a similar way to that disclosed above in which two optical compensating devices 1 and 2 are moved. The optimum condition for compensating the third-order coma aberration $W_{31}$ is determined by the following formula (28).

$$W_{31} - \overline{W}_{31} = -\frac{6}{5} W_{51} \qquad (28)$$

Here, $\overline{W}_{31}$ is an amount of compensating coma aberration. $W_{51}$ is an amount of the fifth-order coma aberration.

$$\overline{W}_{31} = W_{31} + \frac{6}{5} W_{31} \qquad (29)$$

$$= \left\{ \frac{t}{2} \frac{N^2-1}{N^3} NA^3 \left(1 + \frac{3}{10} \frac{N^2+3}{N^2} NA^2 \right) \right\} \theta$$

$$= 4x_0\alpha(N-1)$$

$$\therefore x_0 = \left\{ \frac{t}{8\alpha} \frac{N-1}{N^3} NA^3 \left(1 + \frac{3}{10} \frac{N^2+3}{N^2} NA^2 \right) \right\} \theta \qquad (30)$$

Where one on two optical compensating devices 1 and 2 is moved an amount $X_0$ in the direction for compensating coma aberration.

Examples of the present invention show optical compensating devices located on a planar surface at the side to which a light beam from a light source is incident and located an aspherical surface at the other side as shown in FIG. 7 and FIG. 8. Optical compensating devices may be located a planar surface at the side to which a light beam from a light source is incident and located an aspherical surface at the other side in the present invention. Further two optical compensating devices are combined to use it as one device. Coma aberration generated by a tilt of an optical disc in the direction of the arrow C shown in FIG. 8 may be compensated by the combined device. Coma aberration generated by a tilt of an optical disc in the direction being perpendicular to the sheet may be compensated by another combined device.

While this invention has been described in conjunction with specific embodiments, it is evident that many alternatives, modifications, permutations and variations will become apparent to those skilled in the art in light of the foregoing description. Accordingly, it is intended that the present invention embraces all such alternatives, modifications and variations as fall within the scope of the appended claims.

What is claimed is:

1. An optical pick-up apparatus comprising:

a light source;

an objective lens for converging a light beam emitted from said light source onto a spot on an optical disc;

a beam splitter for separating said light beam emitted from said light source from a returning light reflected back from said optical disc;

a detector for detecting said returning light separated from said light beam emitted from said light source;

an optical compensating device for compensating coma aberration, said optical compensating device comprising a first optical compensating device having a convex aspherical surface represented by $-\alpha R^4$ and a second optical compensating device having a concave aspherical surface represented by $+\alpha R^4$, wherein $\alpha$ is a fourth-order aspherical coefficient which represents a magnitude of the curve of said aspherical surfaces and R is a pupil radius of said aspherical surfaces, said optical compensating device being located on an optical path of said light beam emitted from said light source; and, a driver for moving at least one of said first and second optical compensating devices in a direction perpendicular to an optical axis of said light beam emitted from said light source so as to offset said coma aberration.

2. The optical pick-up apparatus according to claim 1, said first optical compensating device and said second optical compensating device are located at said optical path between said light source and said beam splitter.

3. The optical pick-up apparatus according to claim 2, said convex aspherical surface of said first optical compensating device is located at the side to which said light beam is emitted from said light source and said concave aspherical surface of said second optical compensating device is located at the side to which said light beam is emitted from said light source.

4. The optical pick-up apparatus according to claim 3, said first optical compensating device is located closer to said light source than said second optical compensating device.

5. An optical disc recording and/or reproducing apparatus comprising:

a light source;

an objective lens for converging a light beam emitted from said light source at one spot on an optical disc on an optical axis;

a beam splitter for separating said light beam emitted from said light source from a returning light reflected back from said optical disc;

a first detector for detecting said returning light separated from said light beam emitted from said light source;

an optical compensating device for compensating coma aberration, said optical compensating device having a convex aspherical surface and a concave aspherical surface, said optical compensating device being located on an optical path of said light beam emitted from said light source, wherein each surface is described by an expression including a term having a pupil radius of the surface raised to the fourth power;

a second detector for optically detecting a tilt of said optical disc and producing an output representative thereof; and a driver for moving said optical compensating device in a direction perpendicular to the optical axis of said light beam emitted from said light source in response to said output.

6. The optical pick-up apparatus according to claim 5, further comprising a position detector for detecting a position of said optical compensating device in the direction perpendicular to the optical axis of said light beam emitted from said light source and producing a second output representative thereof, wherein said driver moves said optical compensating device in response to said second output.

7. An optical disc recording and/or reproducing apparatus comprising:

a light source;

an objective lens for converging a light beam emitted from said light source at one spot on an optical disc on an optical axis;

a beam splitter for separating said light beam emitted from said light source from a returning light reflected back from the optical disc;

a first detector for detecting said returning light separated from said light beam emitted from said light source;

an optical compensating device for compensating coma aberration, said optical compensating device being located on an optical path of said light beam emitted from said light source, said optical compensating device comprising a first optical compensating device having a convex aspherical surface described by an expression including a term having a pupil radius of the convex aspherical surface raised to the fourth power and a second optical compensating device having a concave aspherical surface described by an expression including a term having a pupil radius of the concave aspherical surface raised to the fourth power;

a second detector for optically detecting a tilt of said optical disc; and a driver for moving at least one of said optical compensating devices in a direction perpendicular to the optical axis of said light beam emitted from said light source based on an output signal of said second detector so as to offset said coma aberration generated by said tilt of said optical disc.

8. The optical pick-up apparatus according to claim 7, said first optical compensating device and said second optical compensating device are located at said optical path between said light source and said beam splitter.

9. The optical pick-up apparatus according to claim 8, said convex aspherical surface of said first optical compensating device is located between said light source and a beam splitter for separating said light beam emitted from said light source from a returning light reflected back from said optical disc and said concave aspherical surface of said second optical compensating device is located between said light source and a beam splitter for separating said light beam emitted from said light source from a returning light reflected back from said optical disc.

10. The optical pick-up apparatus according to claim 7, further comprising a position detector for detecting a position of said optical compensating device in the direction perpendicular to the optical axis of said light beam emitted from said light source, wherein said driver moves said optical compensating device based on said output signal from said second detector and on an output signal from said position detector.

11. A method for compensating coma aberration comprising the steps of:

locating on an optical path where a light beam is emitted from a light source an optical compensating device for compensating coma aberration, said optical compensating device comprising a first optical compensating device having a convex aspherical surface described by an expression including a term having a pupil radius of the convex aspherical surface raised to the fourth power and a second optical compensating device having a concave aspherical surface described by an expression including a term having a pupil radius of the concave aspherical surface raised to the fourth power; and moving at least one of said first and second optical compensating devices in a direction perpendicular to the optical axis of said light beam emitted from said light source so as to offset said coma aberration caused by a tilt of an optical disc.

12. The method for compensating coma aberration according to claim 11, wherein said first and second optical compensating devices are located between said light source and a beam splitter for separating said light beam emitted from said light source from a returning light reflected back from said optical disc.

13. An optical pick-up apparatus comprising:

a light source;

an objective lens for converging a light beam emitted from said light source onto a spot on an optical disc;

a beam splitter for separating said light beam emitted from said light source from a returning light reflected back from the optical disc;

a detector for detecting said returning light separated from said light beam emitted from said light source; and an optical compensating device for compensating coma aberration, said optical compensating device being located on optical path of said light beam emitted from said light source, said optical compensating device comprising a first optical compensating device having a convex aspherical surface described by an expression including a term having a pupil radius of the convex aspherical surface raised to the fourth power and a second optical compensating device having a concave aspherical surface described by an expression including a term having a pupil radius of the concave aspherical surface raised to the fourth power; and, a driver for moving at least one of said first and second optical compensating devices in a direction perpendicular to an optical axis of said light beam emitted from said light source so as to offset said coma aberration.

14. The optical pick-up apparatus according to claim 13, wherein said driver move said first and second optical compensating device in opposite directions.

* * * * *